United States Patent [19]
Qiao et al.

[11] Patent Number: 6,075,895
[45] Date of Patent: *Jun. 13, 2000

[54] METHODS AND APPARATUS FOR GESTURE RECOGNITION BASED ON TEMPLATES

[75] Inventors: Yong Qiao, Aracadia; Fai Mok, West Hills; Gan Zhou, Altadena, all of Calif.

[73] Assignee: Holoplex, Pasadena, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/879,854

[22] Filed: Jun. 20, 1997

[51] Int. Cl.$^7$ ............................... G06K 9/62; G06K 9/00
[52] U.S. Cl. ..................... 382/218; 382/103; 382/159; 382/203; 345/358
[58] Field of Search ..................... 382/100, 103, 382/155, 156, 159, 195, 201, 202, 203, 218, 232, 236, 270, 271, 272, 273, 277, 278, 282, 287, 309; 345/358, 434, 118; 348/40, 47, 155, 157

[56] References Cited

U.S. PATENT DOCUMENTS

| | | | |
|---|---|---|---|
| 4,843,568 | 6/1989 | Krueger et al. | 364/518 |
| 5,280,530 | 1/1994 | Trew et al. | 382/103 |
| 5,339,104 | 8/1994 | Hong | 348/155 |
| 5,438,360 | 8/1995 | Edwards | 348/208 |
| 5,513,130 | 4/1996 | Redmond | 364/578 |
| 5,517,663 | 5/1996 | Kahn | 395/800 |
| 5,534,917 | 7/1996 | MacDougall | 348/169 |
| 5,594,469 | 1/1997 | Freeman et al. | 345/158 |
| 5,636,292 | 6/1997 | Rhoads | 382/232 |
| 5,684,715 | 11/1997 | Palmer | 345/358 |

OTHER PUBLICATIONS

Watanabe, T., et al.: "Real–Time Gesture Recognition Using Maskable Template Model" Proceedings of the International Conference on Multimedia Computing and systems, Jun. 17, 1996, p. 341–348, XP000676114.

*Primary Examiner*—Matthew C. Bella
*Attorney, Agent, or Firm*—Fliesler, Dubb, Meyer & Lovejoy

[57] ABSTRACT

An apparatus and a method for recognizing the gesture of the image of a player by identifying a gesture from a set of specific pre-defined gestures. In one embodiment, the method includes the steps of retrieving a background image that does not include the player's image, and a current image that includes the player's image and at least a portion of the background image. Then the method removes at least a portion of the background image from the current image to generate the player's image, which is mapped directly to a number of templates to generate a number of template outputs. Finally, the method analyzes the template outputs to identify the specific pre-defined gesture that corresponds to the gesture in the image.

35 Claims, 16 Drawing Sheets

350

352

Compress player's image

354

Perform inner products of the compressed player's images with each pre-compressed template to generate template outputs.

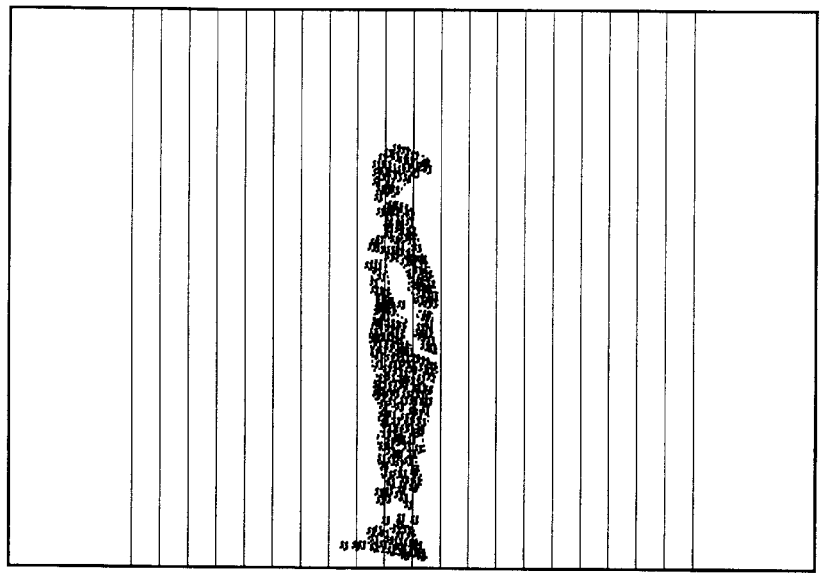
FIG. 10C
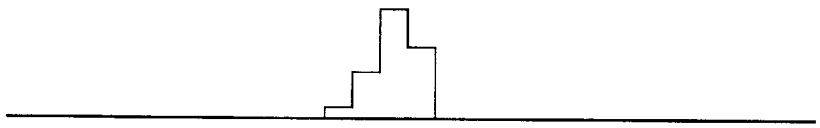
FIG. 10D
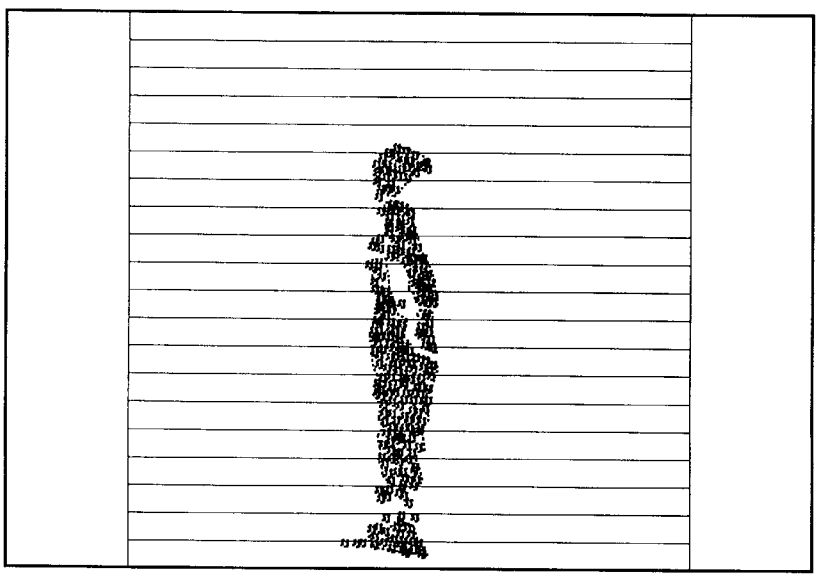
FIG. 10A  FIG. 10B

450

453

Identify the center
of the player's image

↓

455

Identify the height
of the player's image

↓

457

Delete template outputs

Determine gesture  185

A rest gesture? 477

Yes m seconds since the last rest gesture? 479

Yes

Identify and update height and center.

METHODS AND APPARATUS FOR GESTURE RECOGNITION BASED ON TEMPLATES

BACKGROUND

The present invention relates generally to gesture recognition, and more particularly to methods and apparatus for gesture recognition to be used in electronic games and other human-machine interface applications.

In many action-oriented electronic games, a player guides an animated character or a vehicle with an input device, such as a low-key-count keyboard, a joystick or an electronic pointing device, like a mouse. During the process, the character might have to avoid traps, to grab an object, or to fight an opponent. Typically, the player uses a joystick to control the direction of movement of the character, and buttons to activate preset actions, such as jumping and hitting. Though one can learn to manipulate such input devices, it is not natural to act through a joystick or a keyboard.

An alternative method to control animated characters in electronic games is through gesture recognition. In such a method, the player's gesture controls the character's motion. Typically, the player's gesture is captured by an optical or an infrared detector array, such as a video camera. The processor then analyzes the data from the array to identify the gesture, which is then used to control the character's motion. For example, in an on-going game, when the player kicks, a detector array captures the image of the kick and relates it to a processor, which analyzes the image and makes the character kick. This is a more intuitive way to play electronic games. It is much more direct and natural—when the player jumps, the character jumps accordingly.

However, prior art electronic game system implementing such image recognition techniques is relatively slow. One such system uses "dynamic" motion detection to recognize the player's images. In that method, a detector captures consecutive images, and a processor analyzes their differences. For example, as the player punches, the processor constantly compares consecutive images to find the path direction of the punch. The processor typically calculates the derivatives of the values of the pixels in the images. Then the processor extrapolates the direction of motion to identify future positions. Since the processor usually analyzes the images in greyscale, the "dynamic" motion detection technique requires significant amount of floating point multiplication. With significant number of images captured and intensive computation, such methods can accurately recognize gestures. However, this type of system can be slow.

There is still a need for an apparatus and a method that can quickly and accurately recognize a player's gestures.

SUMMARY

The present invention is on an apparatus and a method that can efficiently and accurately recognize the gesture of the image of a player. The invented techniques are much faster than many prior art techniques.

In general terms, the invention includes many pre-defined gestures. Based on invented mapping techniques, one of the gestures is identified as the gesture of the image of the player. In one embodiment, the invention includes a pre-processor, a template-matcher and a post-processor.

Before the player starts to play, a detector captures the image of a background. Then the player stands in front of the background and starts playing. The detector continues to capture the images of the player in front of the background. Note that the background image does not include the image of the player, but the image of the player in front of the background contains at least a portion of the background image. In this invention, the images of the player in front of the background are known as current images.

Before the invention identifies a player's gesture, the pre-processor removes at least a portion of the background image from a current image to generate a player's image. Then, the template-matcher directly maps the player's image to a number of templates to generate a number of template outputs. Based on the these outputs, the post-processor identifies one pre-defined gesture from the set of pre-defined gestures. That pre-defined gesture corresponds to the gesture in the player's image, and is used in the game.

In one embodiment, the background-removal process uses a threshold value and a upper limit value. The process to extract the player's image from the background image posts a number of challenges. They include the player casting shadows, and the colors in the player's clothes substantially matching to the background colors. In these situations, to create a more accurate player's image, the pre-processor uses a thresholding technique.

The thresholding technique operates on each pixel. The pre-processor generates the difference between the value of each pixel in the background image and the value of the corresponding pixel in the current image. Then the pre-processor compares the magnitude of each difference value with the threshold value. Based on the comparison, the pre-processor generates an energy level, which reflects, for example, the size of the player's image. If the energy level is higher than the upper limit value, the pre-processor will change the threshold value and perform the comparison again. A higher energy level can imply that the size of player's image is too big. If the energy level is not higher than the upper limit value, the pre-processor sets the player's image based on the background image, the current image and the threshold value.

In another embodiment, the thresholding process includes a lower limit value also. If the energy level is lower than the lower limit value, the pre-processor will again change the threshold value and perform the comparison again. A lower energy level can imply that the size of the player is too small. In this case, the pre-processor sets the player's image only if the energy level falls between the upper limit value and the lower limit level.

After the background removal process, the template-matcher maps the player's image with a number of templates. In one embodiment, each template has a bar of pixels whose values are one, and the templates are categorized into a number of sets. The bars in the templates within each set are substantially parallel, while the orientations of the bars in different sets are different. Also, combining the bars within each set substantially covers the player's image.

Using the invented templates, the template-matcher performs the mapping process. In one embodiment, each template is represented by a hologram. The template-matcher optically maps the player's image directly with the holograms to generate a number of template outputs. This can be done in parallel. For example, with one hundred templates, all of the one hundred template outputs can be generated simultaneously. In another embodiment, template-matching to generate the template outputs is done by digital electronics.

There can be many template outputs. One way to reduce the number can be based on a position on the player. In one embodiment, the system identifies the center and the height of the player's image. The height information is generated from a set of templates with horizontal bars, while the center information is generated from a set of templates with vertical bars. In one embodiment, based on these information, the post-processor can delete one or more template outputs from all of the outputs. In another embodiment, based on those information, a number of templates are not mapped with the player's image. Those template outputs will not be formed.

The system can regularly identify the center and the height of the player's image. This helps the present invention to analyze players of different sizes, and a player shifting around in front of the background.

Then the post-processor analyzes the template outputs. In one embodiment, the pre-defined gestures are separated into pre-defined general gestures, and pre-defined specific gestures. Each general gesture includes at least one specific gesture. The general gestures can identify the player's body positions, while the specific gestures can identify the player's limb positions and their orientation at certain body positions. For example, one general gesture is standing. Under this general standing gesture, there can be many specific gestures, such as punching and kicking while standing.

In one embodiment, to simplify the analysis process, the post-processor analyzes some of the template outputs to first identify at least one general gesture. Then, the post-processor analyses some of the template outputs to identify one specific gesture that corresponds to the gesture in the image.

In one embodiment, the post-processor identifies the at least one general gesture by a first neural network. Then, based on at least the outputs of the first neural network, the post-processor identifies the specific pre-defined gesture by a second neural network. In another embodiment, the post-processor identifies the gesture based on a set of rules.

After identifying the player's gesture, the present invention repeats the above process to recognize the gestures of the images of the player as the player moves.

The present invention is much more efficient than prior art techniques. For example, the present invention does not depend on calculating derivatives. In one embodiment, the template-matcher maps the player's image directly to all the holograms to generate all the templates outputs simultaneously. Such mapping techniques save a lot of computation time. Another example to save computation time is through the neural network, which is an efficient way to generate the pre-defined specific gestures from the template outputs.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIGS. 10A–F depict examples of template outputs in the present invention.

FIG. 13 shows one set of steps performed by the tracker in the present invention.

Same numerals in FIGS. 1–15 are assigned to similar elements in all the figures. Embodiments of the invention are discussed below with reference to FIGS. 1–15. However, those skilled in the art will readily appreciate that the detailed description given herein with respect to these figures is for explanatory purposes as the invention extends beyond these limited embodiments.

DETAILED DESCRIPTION

Figure 1:
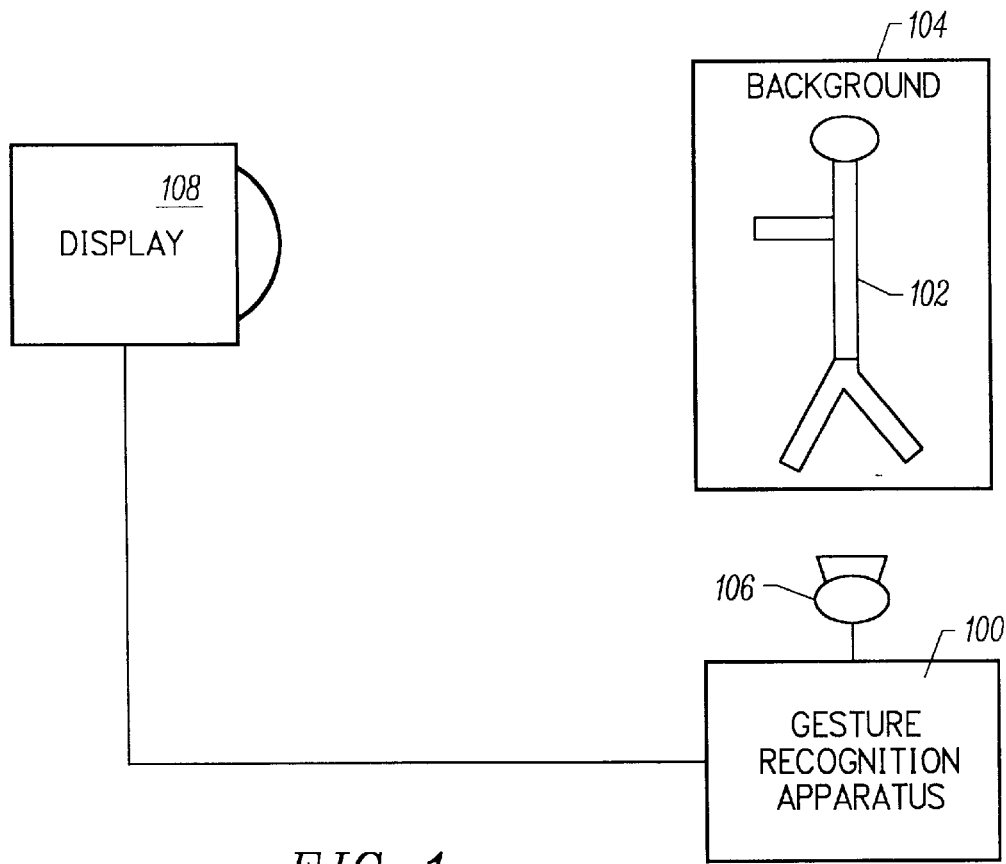
FIG. 1 shows an electronic game station incorporating one embodiment of the present invention.

FIG. 1 shows an electronic game station incorporating an apparatus 100 for the present invention. A player 102, standing in front of a background 104, is playing a game. His image is captured by a detector 106, which can be a camera, such as a charge-coupled-device camera, and is analyzed by the apparatus 100. Based on the analysis, the apparatus 100 identifies the player's gesture to be one of a number of pre-defined gestures, and incorporates that gesture into the game. The incorporation can be translating the gesture into the action of a character in the game shown on a display 108. For example, when he jumps, the character in the game jumps accordingly.

Figure 2:
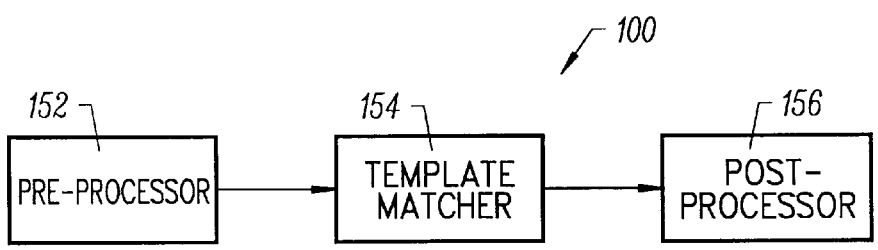
FIG. 2 shows one embodiment of the present invention.
Figure 3:
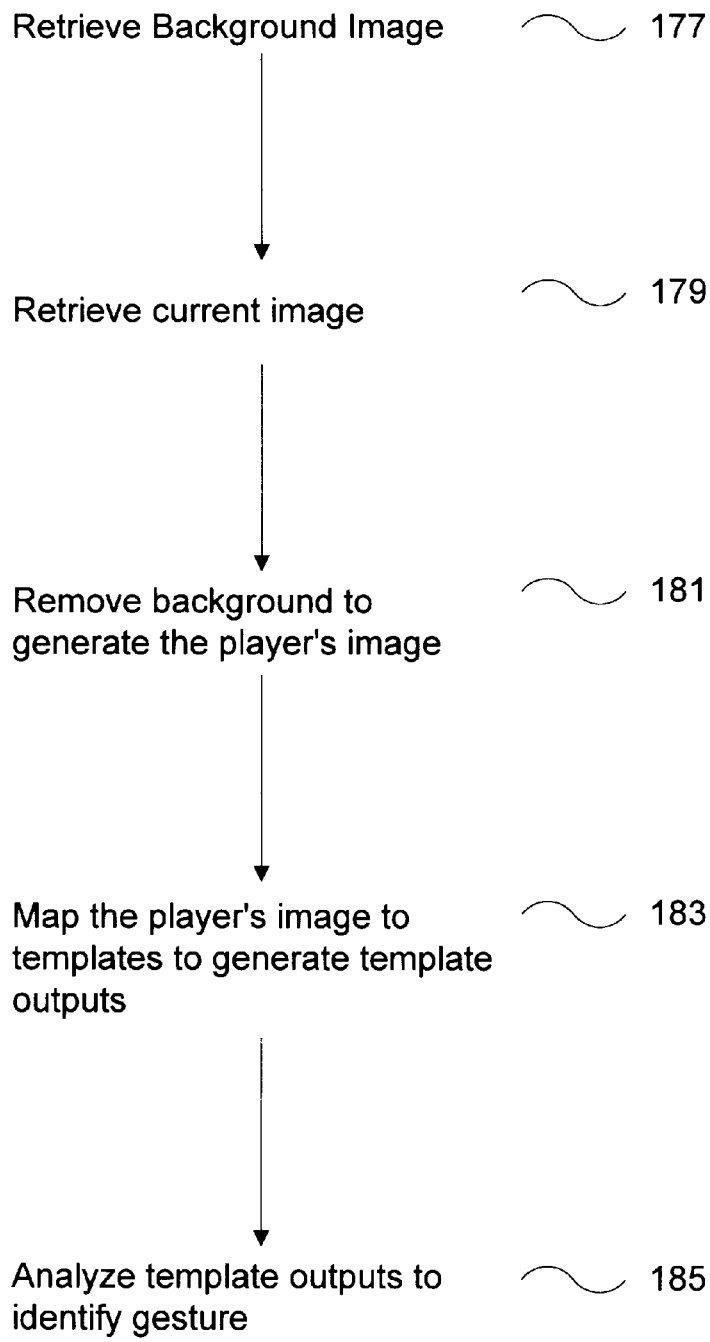
FIG. 3 shows one set of steps to implement the present invention.

In one embodiment, the set of pre-defined gestures is separated into pre-defined general gestures and pre-defined specific gestures. Examples of pre-defined general gestures include jumping, standing and crouching positions; and examples of pre-defined specific gestures include one or more general gestures plus one or more of the following: punching upward, punching forward, punching downward, kicking forward, kicking backward, stepping forward and stepping backward, etc. Thus, while the player 102 jumps, he can punch forward, upward or downward also. In one embodiment the specific gestures are more detailed than the general gestures. For example, a general gesture is standing, while a specific gesture is standing and kicking forward, FIG. 2 shows one embodiment of the apparatus 100, which includes a pre-processor 152, a template matcher 154 and a post-processor 156. FIG. 3 shows one set of steps 175 illustrating in general a method to implement the present invention. First, the pre-processor 152 retrieves (step 177) the image of the background 104, and retrieves (step 179) the current image. The images were captured by the detector 106. The current image shows the player's image merged in the background image. However, the background image only includes the image of the background, without the image of the player.

After retrieving the two images, the pre-processor 152 removes (step 181) at least a portion of the background from the current image to generate the player's image. Then the template matcher 154 maps (step 183) the player's image to a number of templates to generate template outputs. Analyzing the outputs (step 185), the post-processor 156 identifies one or more of the pre-defined gestures that correspond to the gesture in the player's image. In one embodiment, the identification process is based on a set of rules. The rules are typically stored in a database or in a look-up table residing in a storage medium, which the post-processor 156 can access.

The present invention can repeatedly identify the player's gestures. In one embodiment, after identifying one gesture (step 185) and using the gesture in the game, the present invention can repeat from the step of retrieving a current image (step 179) to identify another gesture.

Figure 4:
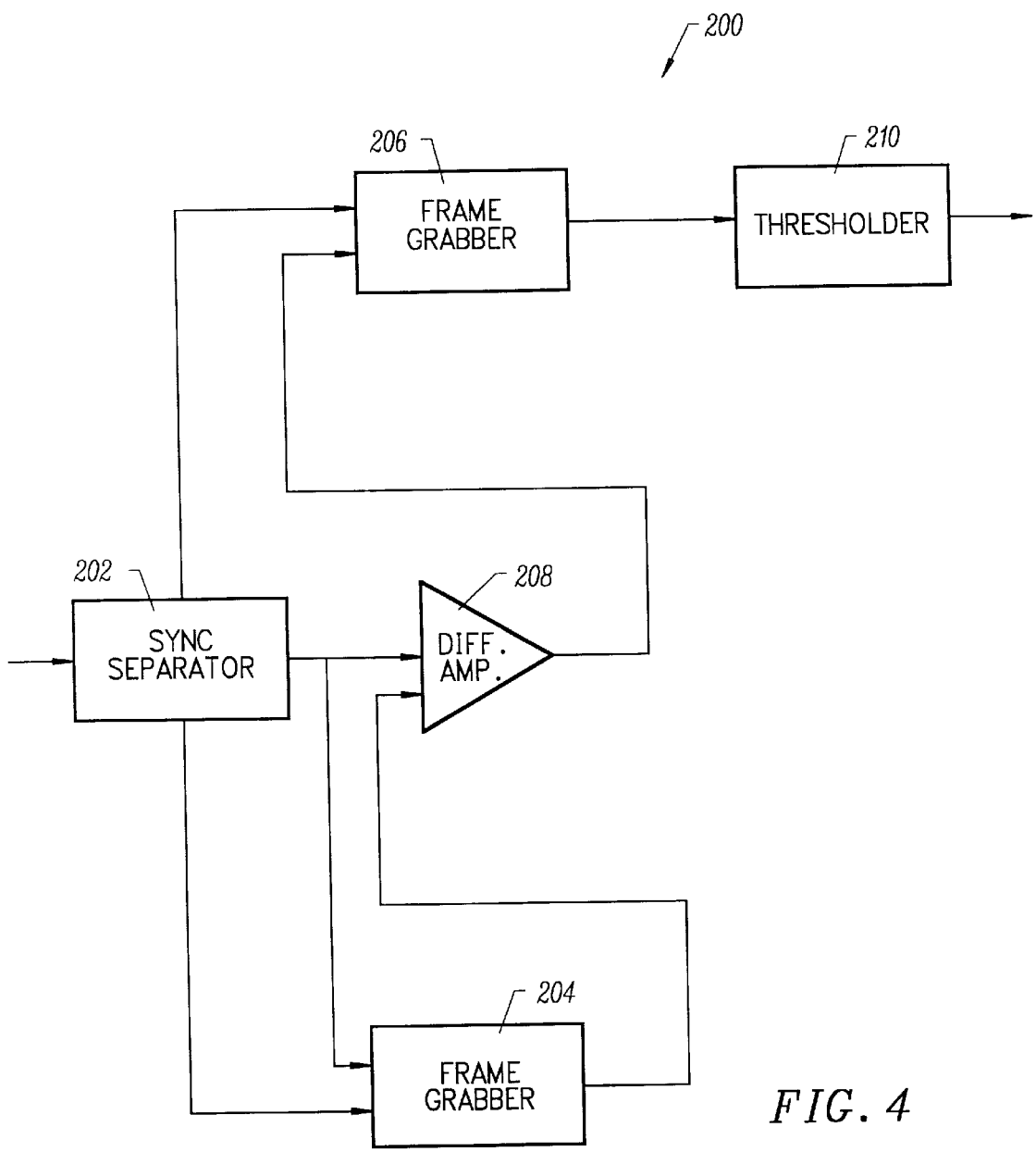
FIG. 4 shows one embodiment to remove background images in the present invention.

FIG. 4 shows one embodiment of a background remover 200 in the pre-processor 152. In this embodiment, the images, whether they are the background or the current images, have many pixels, and are in gray-scale, with many possible levels of intensity. Also, the images can be in color or in monochrome, or can be frames from a video signal. In the embodiment shown on FIG. 4, the background remover 200, based on the background image, modifies the values of the pixels in the current image to generate the player's image.

In one embodiment, the background remover 200 acts on frames from a video signal. First, the detector captures the background image and generates the video signal, and the remover 200 retrieves it. The first frame grabber 204 grabs the background image and stores it. Then, the detector captures the current image and generates its video signal, and again the background remover 200 retrieves it. A sync separator 202 extracts the sync signal from the video signal, and provides it to two frame grabbers 204 and 206. The frame grabber 204 generates the video signal of the stored background image using the sync signal. The differential amplifier 208 receives both the current image and the background image, and subtracts one from another. The second frame grabber 206 grabs the output of the differential amplifier 208, and couples the digitized signal to a thresholder 210, which reduces a gray-scale image to an image with two levels. In one embodiment, the thresholder 210 can be implemented with a look-up table in the frame grabber 206.

Figure 5:
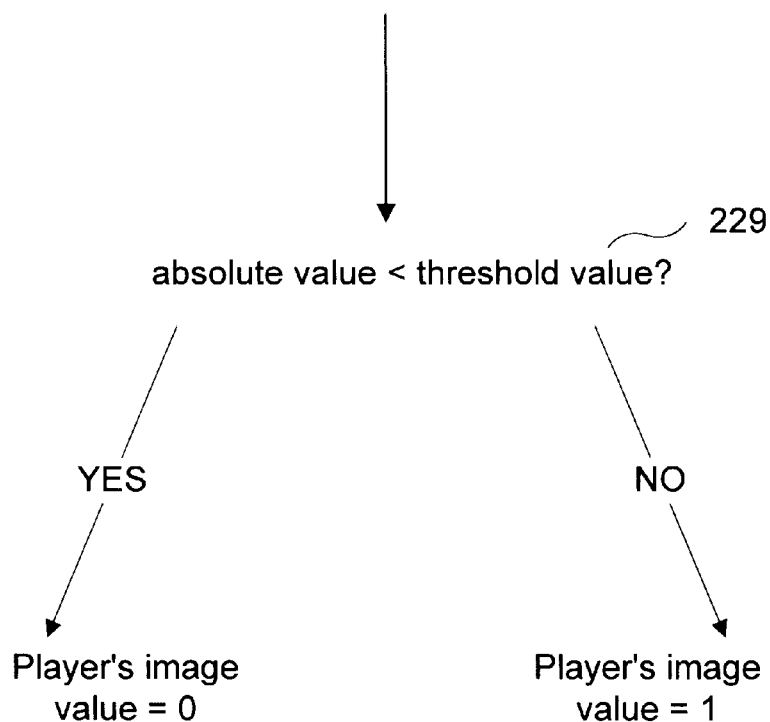
FIG. 5 shows one set of steps on thresholding in the present invention.

FIG. 5 shows one set 225 of steps on thresholding by the thresholder 210. The intensity value of every pixel digitized by the second frame grabber 206 can be positive, negative or zero. At each pixel, first, the thresholder 210 finds the magnitude (step 227) of the value at that pixel. The thresholder 210 then compares (step 229) the magnitude or the absolute value with a threshold value. If the absolute value is smaller, the value of that pixel becomes zero; otherwise it becomes one. This "binarizes" the player's image, or changes the values in each pixel of the player's image to one of two values.

The process to remove at least a portion of the background so as to identify the profile of an image can take a number of factors into consideration. Typically, the player 102 casts a shadow on the background 104, but the player's image should not include the shadow, which is a function of the lighting of the environment. Another factor is that the colors in the player's clothes may be similar to the background color; for example, the player may wear a white shirt, and the background may also be white in color. It might be difficult to separate the white shirt from the white background. One method to minimize this color-blurring problem is to have a special or peculiar pattern on the background. This will reduce the likelihood of anyone wearing clothes with similar design. Another technique to resolve such problems is to have the thresholder 210 modify the threshold value.

Figure 6:
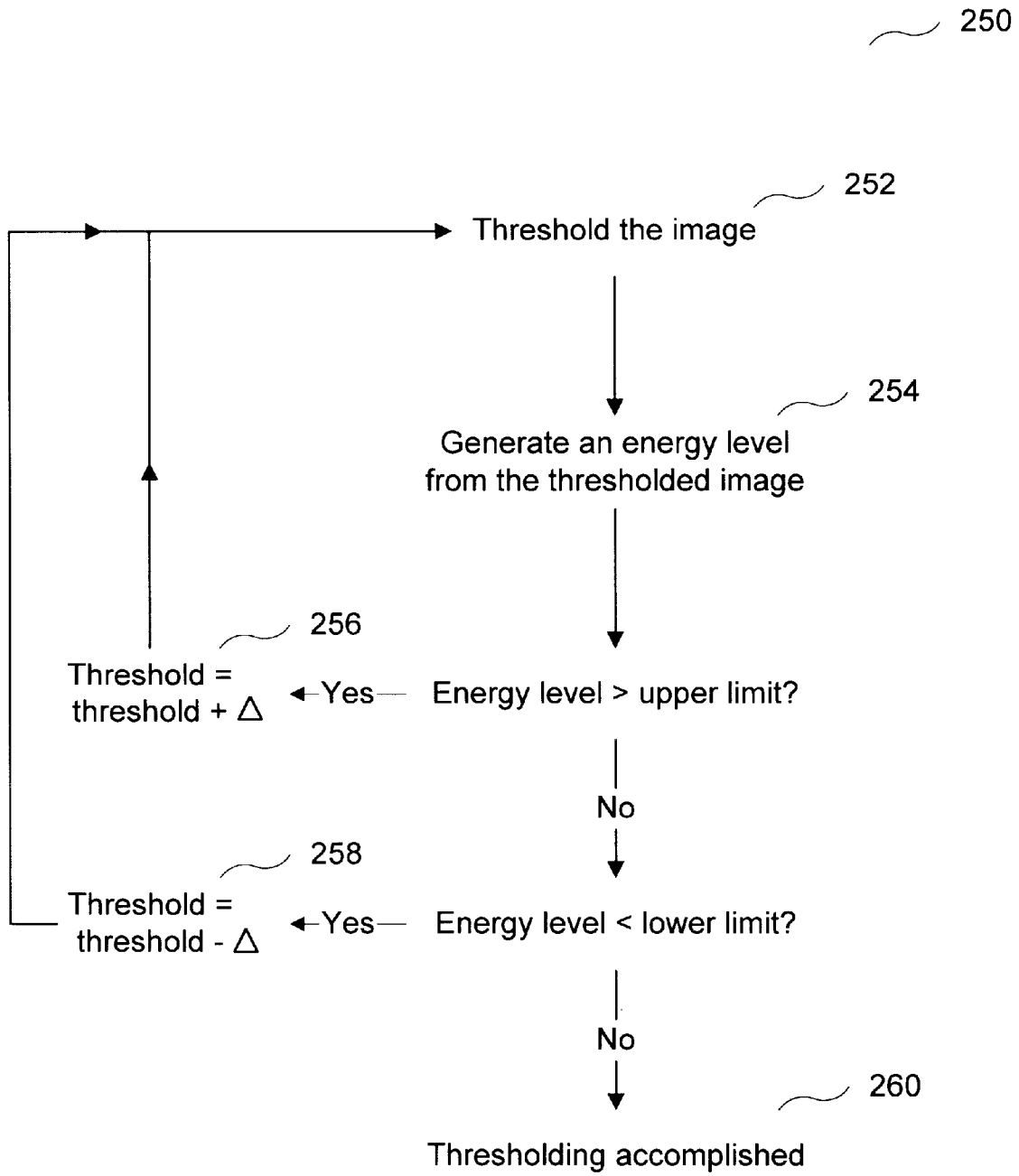
FIG. 6 shows one set of steps on setting the threshold value in the present invention.

FIG. 6 shows one set 250 of steps for the thresholder 210 to set the threshold value. First, based on a pre-set threshold value, the thresholder 210 thresholds (step 252) or binarizes the player's image. Then, the thresholder 210 generates (step 254) an energy level from the thresholded image. This level reflects the size of the player's image. In one embodiment, the energy level is the sum of the values of all the pixels in the thresholded image.

The size of an average player should be within a upper and a lower limit, which can be previously entered into the thresholder 210. If the energy level is higher than the upper limit value, the size of the player is too big; the thresholder will increase (step 256) the threshold value by delta and perform thresholding (step 252) on the output from the second frame grabber 206 again. If the energy level is lower than the lower limit value, the size of the player is too small; the thresholder 210 will decrease (step 258) the threshold value by delta and perform thresholding (step 252) again on the output from the second frame grabber 206. If the energy level is within the upper and the lower limit, the threshold value is considered appropriate, and thresholding is accomplished (step 260). The value for delta is a compromise between the speed of convergence and the quality of the player's image. In one embodiment, the gray scale image has 256 levels, and the delta is 2.

The upper and the lower limits can be set so that the thresholder 210 can obtain a well-defined binary image of the player under various conditions, such as players of different sizes, clothes having different colors, and different lighting conditions. One approach to set the limits is to sample many individuals. To set the lower limit, the approach picks the largest individual from the group. The lower limit is the lowest value one can set the limit while the apparatus 100 can still identify the player's image. Similarly, to set the upper limit, the approach picks the smallest individual from the group. The upper limit is the largest value one can set the limit while the apparatus 100 can still identify the player's image.

The energy level can be used to determine if the player is in front of the background. In one embodiment, the player is deemed to have left if the energy level of the player's image is lower than a minimum level. For example, if the detector is made up of an array of 100 by 100 sub-detectors, the minimum level can be 40 units. This means that after thresholding, only 40 or fewer pixels register the value of one. In another embodiment, if the pre-processor decides that the player has left, the pre-processor can retrieve another background image (step 177). This ensures that if, for example, the lighting has changed, the background image is updated.

After the pre-processor 152 removes (step 181) the background image to generate the player's image, the template matcher 154 maps (step 183) the player's image to a number of templates to generate template outputs. In one embodiment, mathematically, the template-matching output of a particular template is obtained by performing either a correlation operation or an inner-product operation between the player's image and that template.

Figure 7B:
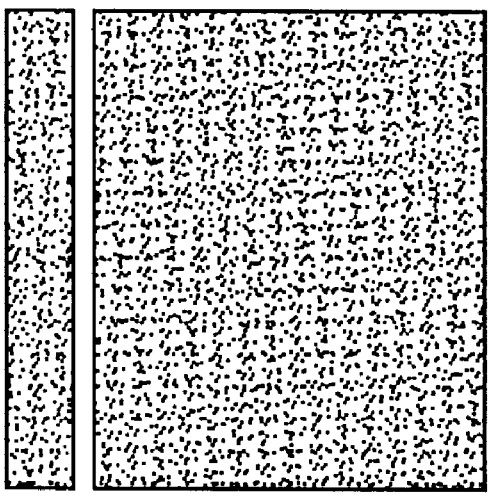
FIGS. 7A–H show examples of different representations of one embodiment of templates used in the present invention.
Figure 7A:
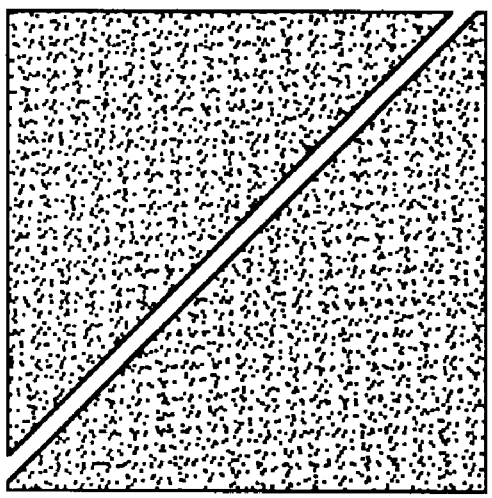
Figure 7C:
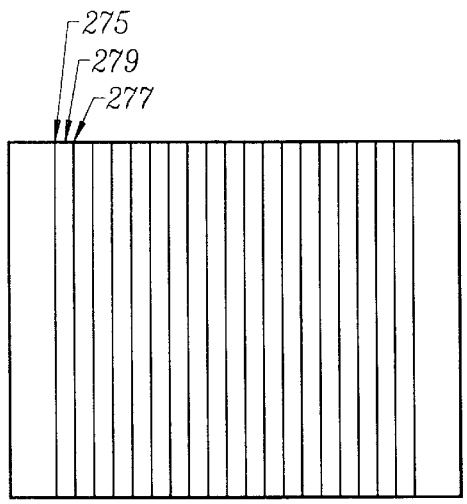
Figure 7D:
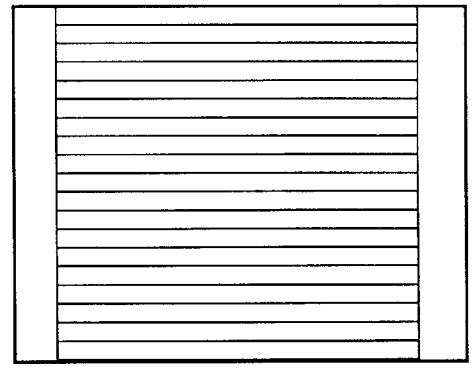
Figure 7E:
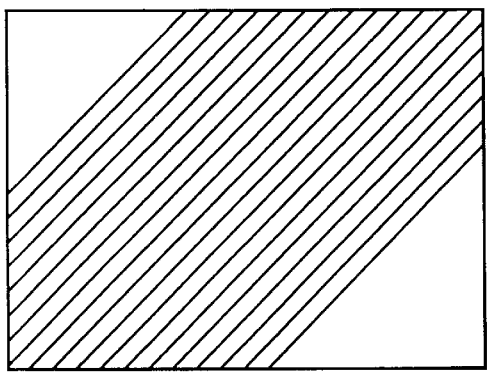
Figure 7F:
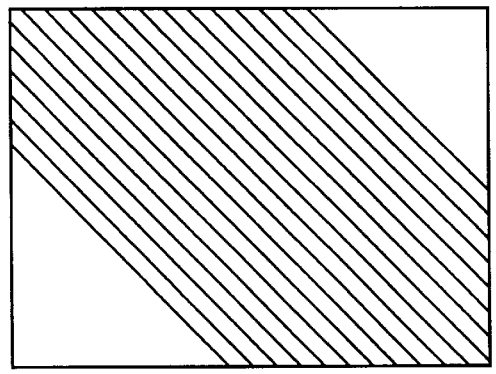
Figure 7G:
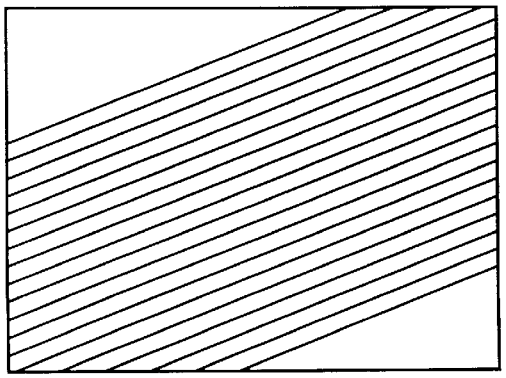
Figure 7H:
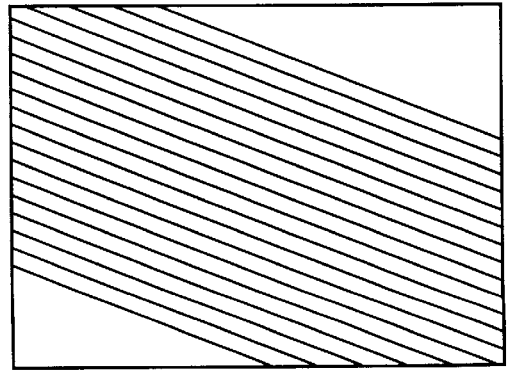

In one embodiment, all of the templates have very simple patterns. For example, each template has a bar of pixels whose values are non-zero, such as one. In one representation, pixels with values being one are transparent, while pixels with values being zero are opaque. FIGS. 7A–B show one embodiment of examples of such templates. In FIG. 7B, the size of that template has 120 by 120 pixels, and the width of the bar has 6 pixels.

The templates are typically stored in a storage medium in the template matcher 154. They are separated into a number of sets of templates, with the bars in the templates within each set being substantially parallel, and with the orientations of the bars in different sets being different. One embodiment uses eight sets of templates, with the eight different orientations being 0°, 22.5°, 45°, 67.5°, 90°, 112.5°, 135° and 157.5° from the x-axis. The bars have a certain width, and all of the bars within each set, when combined, substantially cover the player's image. FIGS. 7C–H show another representation of the bars. This representation only shows the boundaries for each bar. For example, in FIG. 7C, the boundaries 275 and 277 for a vertical bar 279 are shown. In another embodiment, there are altogether 118 templates.

Figure 8:
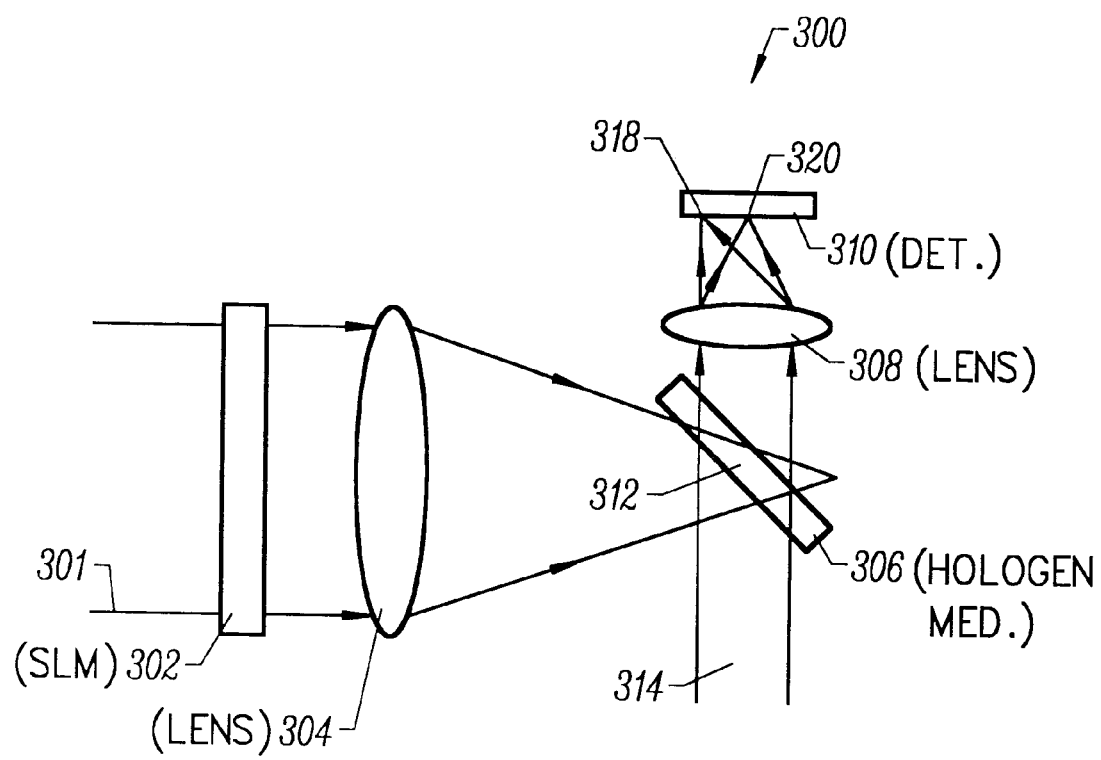
FIG. 8 depicts an optical apparatus to map the player's image to templates for the present invention.

There are a number of different template-matching embodiments to map the player's image directly to the templates. FIG. 8 depicts an optical apparatus performing the mapping. In this embodiment, holographic recording of the templates can be done in the following way. The image of a template is displayed on a spatial light modulator (SLM) 302. A plane wave 301 illuminates the SLM 302, whose output (called the object beam) is focused by a lens 304 onto a spot 312 on a holographic medium 306. The holographic medium is also illuminated by a plane wave 314, which is called the reference beam and is coherent with the object beam. The interference pattern formed by the object beam and the reference beam 314 is recorded in the holographic medium 306 as either a volume hologram or a 2-D hologram. This hologram is referred to as the hologram of the template displayed on the SLM 302. In one embodiment, the hologram of a second template is recorded at the same location 312 of the medium 306 by displaying the second template on the SLM 302 and changing the direction of the reference beam 314. All of the template holograms can be recorded at the same location 312 of the medium 306 by repeating the steps described above. A detailed description on recording holograms can be found in "Optical Holography", written by R. J. Collier, C. B. Burckhardt and L. H. Lin, and published by Academic Press in 1971.

During template matching, the player's image is displayed on the SLM 302 and the reference beam 314 is turned off. The output from the SLM 302 is focused by a lens 304 onto the hologram location 312 on the holographic medium 306. A light beam is reconstructed from each template hologram. The direction of each reconstructed beam corresponds to the direction of the reference beam used to record the hologram of that template. Thus, each beam, when focused by a lens 308, falls onto a different element of the detector array 310, which is located at the focal plane of the lens 308; for example, one focused beam can fall onto one detector element 318, and one falls onto another detector element 320. At the focal plane of the lens 308, the intensity profile of the reconstructed beam from each template is the template output for that template.

If the holographic medium 306 is located in or near the image plane of the SLM 302, then the template output is proportional to the inner product of the player's image and the corresponding template. If the holographic medium 306 is located or near the focal plane of the lens 304, then the template output is proportional to the correlation between the player's image and the corresponding template. In one embodiment, the inner-product operation between the player's image and each template is performed during template matching. With all the holograms stored at the same spot, all of the template outputs are generated simultaneously. In one embodiment, the detector array 310 is a linear array with 118 detector elements—one element per template output.

In another embodiment, the template holograms are stored at different locations. The output from the spatial light modulator 302 scans or is duplicated to the different locations to map the player's image over each of the templates. Such template outputs can be designed to again fall onto different detectors, or onto the same detector at different time. The techniques to generate such holographic responses should be obvious to those skilled in the art, and can be found in "Holographic Memories," written by D. Psaltis and F. Mok in the November 1995 issue of Scientific American.

The above mapping approach to perform inner products can be done electronically also. In one embodiment, the value at each pixel of the player's image is multiplied to the value at the corresponding pixel in each template. After the multiplication process, the outputs in the pixels on a template are summed to get the inner product or template output for that template.

Figure 9:
FIG. 9 shows an electronic approach to map the player's image to templates for the present invention.

FIG. 9 illustrates one embodiment showing one set 350 of steps for an electronic mapping approach. First, the template matcher 154 compresses (step 352) the digitized player's image. In this embodiment, the digitized templates have previously been compressed in the same fashion. Then, the template matcher 154 performs inner products (step 354) of the compressed player's image with each template that has been pre-compressed to generate template outputs.

In one embodiment, the digitized player's image and the digitized templates are binarized. The compression can be combining the numerous pixels, each represented by one bit, on the player's image into bytes, or into words with many bits, such as 64 bits. The inner product is calculated by first performing a bitwise AND operation between each word from the compressed player's image and the corresponding word from the compressed template, then finding the number of logic-one's in the resulting word either by counting the number of one's or by using a look-up table. This process is repeated for all the words in the image if there is more than one word, with the results from all the word-matching processes summed. The simultaneous pixel matching and the use of look-up table increase the speed of computation.

Figure 10E:
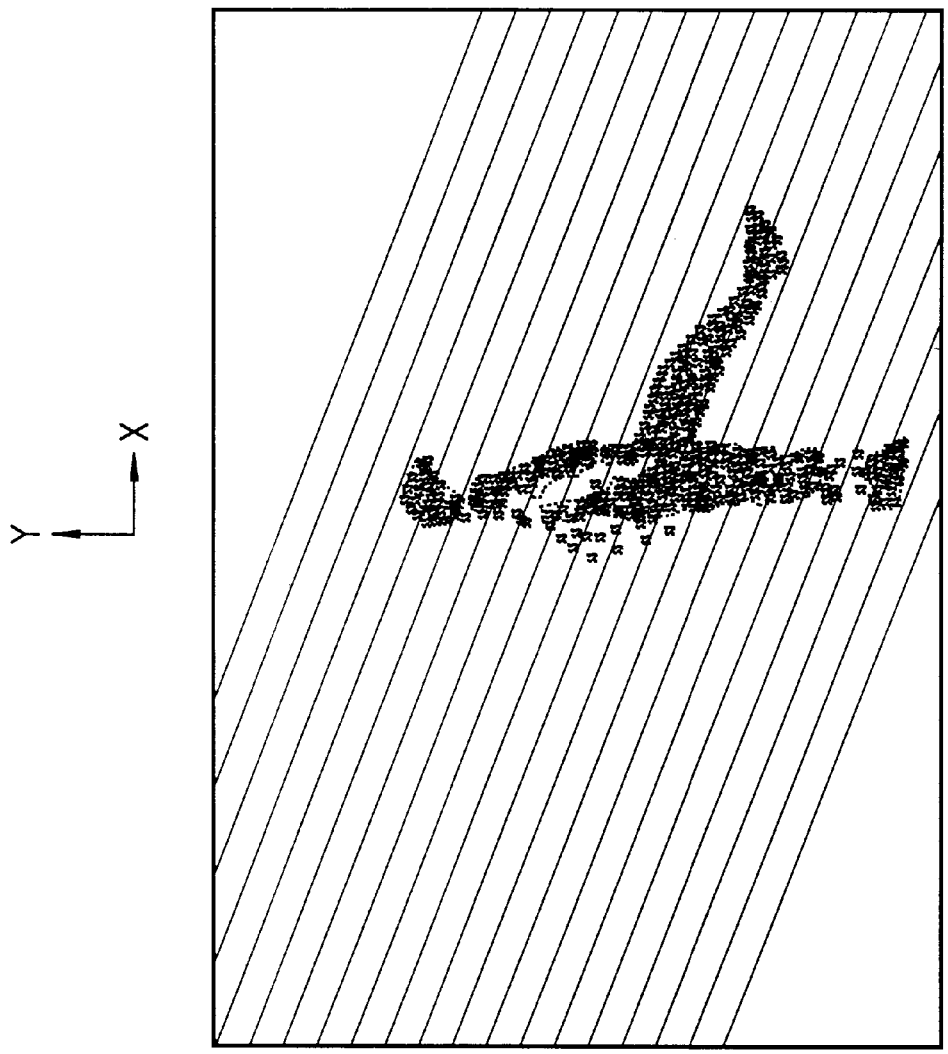
Figure 10F:
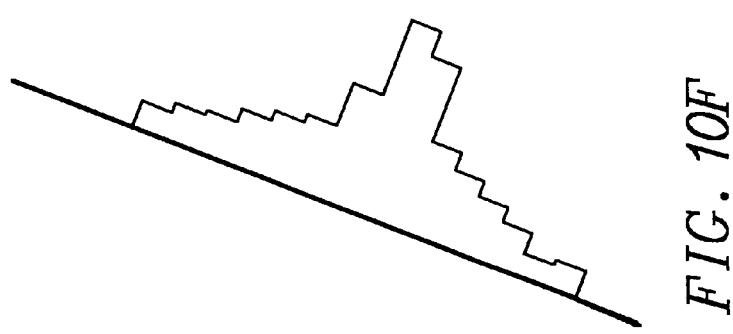

FIGS. 10A–F depict examples of template outputs. FIG. 10A shows the player's image mapped onto a set of vertical height templates; and FIG. 10B shows template outputs in a histogram, which also indicates the height of the player 102. FIGS. 10C and 10D show the corresponding outputs for horizontal position templates, which also indicate the width of the player 102. Outputs indicating height and width generally provide the player's body positions. FIGS. 10E and 10F show the outputs for templates with bars having an orientation of 157.5° from the x-axis; the outputs generally show the player's limb positions and their general orientation.

Figure 11:
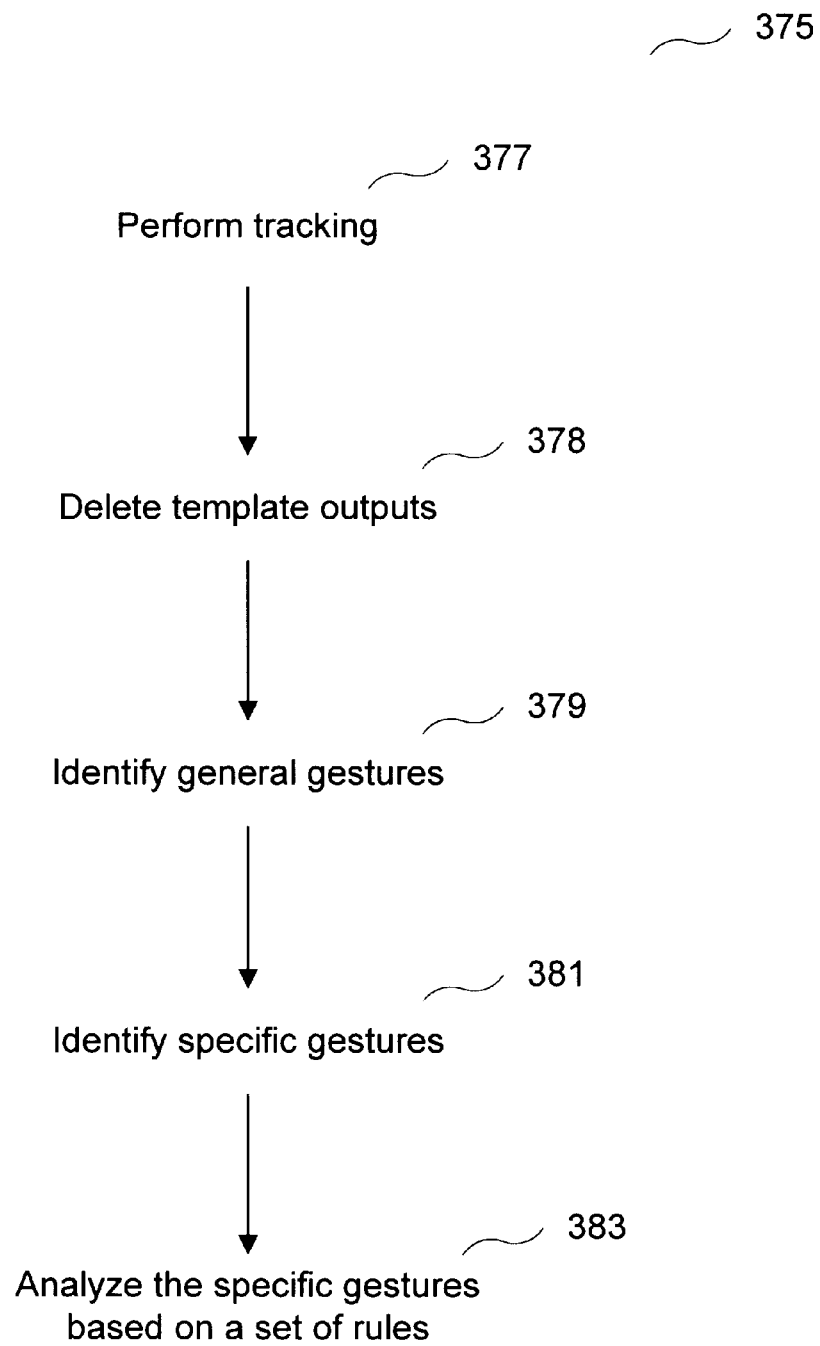
FIG. 11 shows one set of steps analyzing template outputs performed by the post-processor in the present invention.

After the template matcher 154 generates the template outputs, the post processor 156 analyzes those outputs to identify the specific pre-defined gesture that corresponds to the gesture in the player image. FIG. 11 shows one set 375 of steps analyzing template outputs performed by the post-processor in the present invention. In this embodiment, the post-processor 156 tracks (step 377) the player's body position, and may delete (step 378) one or more template outputs. One rationale for the deletion is that the outputs from a number of templates may be null, as illustrated, for example, in the far-left and the far-right templates in FIGS. 10C & D. Based on the player's body position, the post-processor 156 may not analyze the outputs from those templates. In another embodiment, based on the player's body position, the template matcher 154 may not even perform the matching of the player's image with a number of templates. In other words, there will be fewer template outputs than the number of templates.

In one embodiment, from the player's position, the post-processor 156 identifies (step 379) pre-defined general gestures, identifies (step 381) pre-defined specific gestures, and analyzes (step 383) the specific gestures based on a set of rules to identify the one or more of them that correspond to the gesture in the player's image. The set of rules can be generated based on known inputs and known outputs. Generating such rules with known inputs and outputs should be obvious to those skilled in the art.

Figure 12:
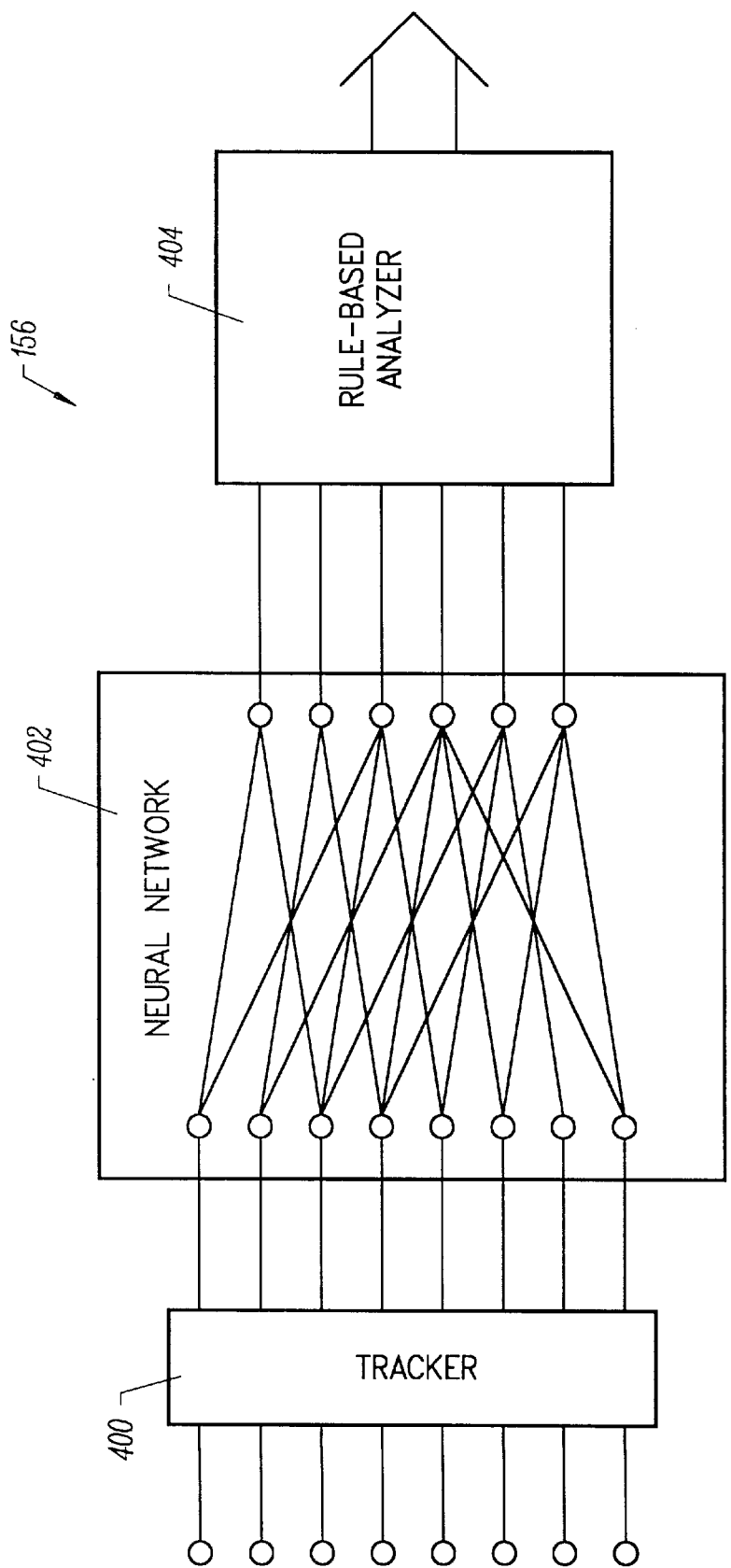
FIG. 12 depicts one embodiment of a post-processor in the present invention.

FIG. 12 depicts one embodiment of a post-processor 156. A tracker 400 receives the template outputs, and performs the tracking and the deleting template-outputs functions. From the remaining template outputs, a neural network 402 generates one or more pre-defined specific gestures. Then, a rule-based analyzer 404 analyzes the specific gestures to identify the gesture in the player's image.

In more details, FIG. 13 shows one set 450 of steps of the tracker 400 deleting template outputs. In this embodiment, the tracker starts by identifying the center (step 453) of the player's image, and the height (step 455) of the player's image. Height and center identification can be done, for example, through the template-output histograms shown in FIGS. 10B and 10D. The highest non-zero point of the histograms in FIG. 10B shows the player's height, while the maximum-value point of the histogram shown in FIG. 10D shows the player's center. Note that determining the player's height and center only requires mapping the player's image to two sets of templates, and does not require mapping the image to all of the sets of templates.

Based on the identification, the tracker 400 may delete (step 457) one or more template outputs from further analysis. In this embodiment, the player's image has previously been mapped to all the templates. Based on the center and the height information, the tracker 400 may delete one or more template outputs. Those outputs will not be analyzed. The idea here is that all the template outputs have already been formed. The center and the height information eliminates some of the outputs from being analyzed so as to reduce the amount of analysis needed. This embodiment can be implemented by the holographic mapping approach.

In another embodiment, based on the identification of the center and the height information by the tracker, the template matcher 154 deletes at least one template from one set of templates from the matching process; the one or more deleted templates have not been mapped to the player's image before. Then, the template matcher 154 maps the player's image to the remaining un-mapped templates to generate template outputs. In this approach, initially, the template matcher 154 only maps the player's image to the templates required to identify the player's center and height. Based on the center and the height information, one or more templates will not be needed to map with the player's image; they are relevant to areas that the player's image is not located at. Those one or more templates are deleted for this particular player's image, with the remaining templates mapped to generate additional template outputs. This embodiment can be implemented by the electronic mapping approach.

In one embodiment, based on the height and the center information, the post-processor 156 identifies the player's gesture at a similar speed whether the player shifts around, such as in the left or right direction, or towards or away from the detector 106. In other words, the post-processor 156 becomes substantially shift and scale invariant. It is shift invariant because though the player shifts around, the tracker can identify his center, and perform the analysis from there. The post-processor 156 is scale invariant because though the player can be of different height, or can move towards or away from the detector, the tracker can identify his height, and perform the analysis from there.

Also the change in one or more specific locations on the player, such as the player's center, can be used to help recognize gestures, such as the player stepping forward or stepping backward. Generally, it is difficult to identify whether the player has stepped forward or backward just by one image. It is a lot easier to identify such gesture by analyzing two images: one captured before the player has stepped forward, which, in one embodiment, can be considered as a gesture also, and the other captured while the player is stepping forward, or after the player has stepped forward.

Figure 14:
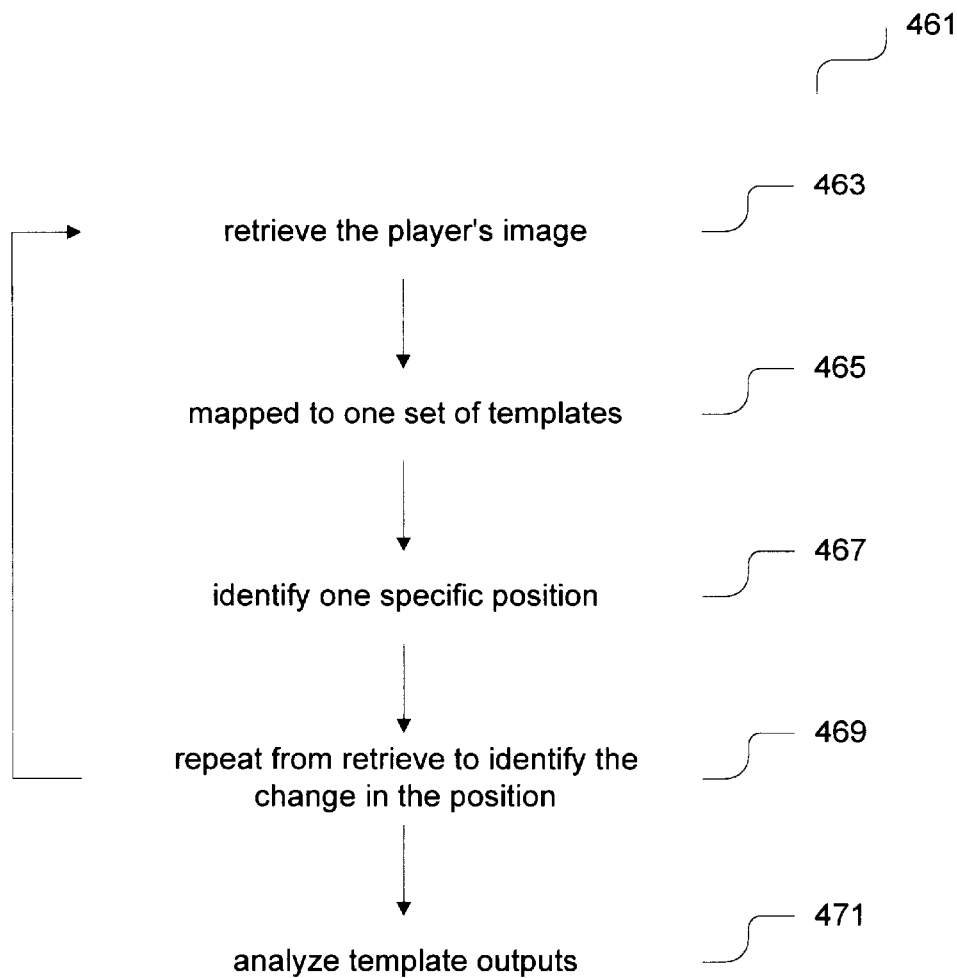
FIG. 14 shows one set of steps using the change in a specific location on the player's image to help identify gestures.

FIG. 14 shows one set 461 of steps that uses the change in a specific location on the player's image to identify one or more gestures. Assume that the player's image has already been generated. Then that image is retrieved (Step 463) and is mapped (Step 465) by the template matcher to at least one set of templates to generate template outputs. Based on the template outputs, one specific location on the player's image is identified (Step 467) by the tracker. For example, this position can be the center of the player's image or can be the top of the player's head. As the player moves, steps 463 to 467 are repeated (Step 469) to identify the change in the specific location by the tracker. Based on the change in the location, template outputs are analyzed (Step 471) by the post-processor to identify the player's gesture. For example, in a player's image, template outputs indicate that the player is standing with his hand extended forward. In a subsequent image, template outputs indicate that the player is still standing with his hand extended forward. However, the center of the player has moved forward also. Based on the movement of the center of the player, the apparatus 100 can determine that the player has moved forward while standing with his hand extended forward. In another example, the player is standing with his hand extended downward; the subsequent image shows the same gesture, except the top of the player's head has moved upward. Based on the movement of the top of the head, the apparatus 100 can determine that the player has jumped up with his hand extended downward.

Figure 15:
FIG. 15 shows one set of steps to determine when to update tracking information in the present invention.
Figure 15:
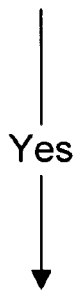
Figure 15:
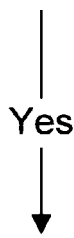

The tracker 400 may not want to update the center or the height information all the time. In one embodiment, updating occurs when the player 102 is at rest, and when updating has not been done for a period of time. FIG. 15 shows one set 475 of steps to determine when to update the center and the height information. First, assume that the player's gesture has already been identified (step 185). Then, the tracker 400 determines (step 477) whether the gesture is a rest gesture, which, in one embodiment, is defined as a standing gesture with both hands hanging down. The tracker 400 also decides (step 479) whether m seconds has passed since the player was in the rest gesture, where m can be 2. If m seconds has passed, and if the player is in the rest position, the tracker 400 will identify and update the height and the center of the player. The above description, focuses on both the center and the height of the player. In another embodiment, only one location is tracked. In yet another embodiment, more than 2 locations are tracked.

In one embodiment, the neural network 402 analyzes the template outputs. A neural network is a network whose circuit parameters are learnt through known inputs and known outputs. Parameters, also known as weights of interconnections, in the circuit are modified until the known inputs provide the known outputs. Generating such networks should be obvious to those skilled in the arts.

Using neural network is just one approach to analyze the outputs. Other approaches are applicable, such as a rule-based system. In a rule-based system, the rules are set based on the known inputs and known outputs. When an input is received, the ruled-based system compares it with its rules to generate the appropriate output. Generating such ruled-based systems should also be obvious to those skilled in the art. Whether a neural network or a rule-based system is used, the analysis can be modified into a two-step approach.

For the two-step approach, in one embodiment, first, the template outputs are analyzed to identify one or more pre-defined general gestures that the image's gesture belongs. Then, in a second step, one or more pre-defined specific gestures that correspond to the image's gesture are identified. For example, the first step determines the player's body general information, which indicates that he is crouching. Then the next step determines the player's limb locations and orientations while he is crouching, and they indicate that he is punching up. In one embodiment, the first step uses only a portion of the template outputs, while the second step uses the results from the first step and some of the template outputs. Both steps may not analyze all of the template outputs at once. Such two-step approach can reduce the complexity of the problem and increase the accuracy of recognition. Based on the above description, it should be obvious to those skilled in the art that the problem of analyzing the template outputs can be further separated into more than two steps.

In one embodiment, the neural network is either a two-layer neural network, or two sequential neural networks. The first layer or the first neural network of the sequence identifies the one or more pre-defined general gestures the image's gesture belongs. The second layer or the second neural network of the sequence identifies the one or more pre-defined specific gestures the image's gesture belongs. Using more than one neural network or using a neural network with more than one layer reduces the complexity of designing a neural network to analyze all of the template outputs. Based on the description, it should be obvious to those skilled in the art that more than two neural networks, or a neural network with more than two layers can be used to analyze the template outputs.

In one embodiment, the one or more outputs from the neural network 402 identify the pre-defined specific gesture that corresponds to the gesture in the image. In another embodiment, after the neural network 402 identifies one or more pre-defined specific gestures, a rule-based analyzer 404 identifies one specific gesture that corresponds to the gesture in the image. The rule-based analyzer can be a look-up table.

The types of rules used can depend on the types of games a player is in, and the type of templates used. If the game is for a player fighting only one opponent, then an example of a rule is: "If the pre-defined specific gesture is kicking backwards and punching upwards while the player is standing, actually the player's gesture is kicking backwards with his body leaning forward while the player is standing."

The reason is that a player would not kick backward and punch upwards at the same time—there is only one opponent. However, when the player kicks backwards, to maintain balance, he typically leans forward. With the player leaning forward, probably, the templates in FIGS. 7E and 7G, which can be used to indicate that the player punches upwards, would register some values. Since the leaning forward motion might be mistaken as punching upwards, the above rule is established. Based on the types of games and the templates used, a set of rules are generated. These rules can be stored in a look-up table, and are stored in a medium that can be accessed by the post-processor.

The present invention is not limited to gestures. In one embodiment, the player's sound is also captured. As the character on the monitor moves following the gesture of the player, the character also makes the same sound as the player did. In yet another embodiment, the player's face is digitized, and is used as the face of the character in the game.

The present invention is not limited to players. In one embodiment, the present invention is also applicable to recognizing the gestures of other living beings, such as dogs. In another embodiment, the invention is also applicable to robots simulating a living being. In one embodiment, the living beings and the robots are collectively known as beings, which, in the present invention, include living beings and robots simulating living beings. Also, if a being is in contact with a non-being, in one embodiment, the being with the non-being is collectively considered as a being. For example, if a man is holding a knife, the man and the knife together are considered as a being.

The present invention is not limited to playing games. Gesture recognition can be applied to manipulating objects. For example, a robot can follow a man's gesture. As he moves, its gesture is recognized, and the robot follows it. For example, as he raises his hand, the robot moves an object up accordingly.

In the present invention, the word "gesture" can have a number of meanings. In one embodiment, the word "gesture" implies the use of movement of limbs or a body as a means of expression. This includes the body in resting position, such as standing, because the expression conveyed is resting. In another embodiment, the word "gesture" implies the change in relative positions of some parts of a being. For example, the player may be holding a knife. By moving her fingers a little bit, the knife can move significantly. This knife movement is considered as a gesture in the present invention because there is a change in relative positions of some parts of the being, which is the player holding the knife.

In one embodiment, the present invention includes the pre-processor, the template-matcher, the post-processor and the detector 106. In another embodiment, the present invention also includes the monitor 108. In yet another embodiment, the present invention further includes the background 104.

FIG. 1 shows only one detector 106 capturing images. In another embodiment, images can be captured by more than one detector or camera, with the different detectors capturing images from different directions.

The present invention describes one technique to obtain the images of a player by current images and background images. In other embodiments, there are other ways to obtain the image of a player. For example, the player can be playing in a controlled environment. The background is black and the player's clothing is white. In such a controlled environment, the current image is substantially the player's image.

The present invention also includes one or more storage media. They can used in many ways. For example, after the player's image has been generated, one storage medium can store the image. Then the image is retrieved to be analyzed. The storage media can be in one or more of the following: the pre-processor, the template matcher and the post-processor.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method for recognizing the gesture of the image of a being by identifying a gesture from a set of specific pre-defined gestures, the method comprising the steps of:

retrieving a background image that does not include the being's image;

retrieving a current image that includes the being's image and at least a portion of the background image;

removing at least a portion of the background image from the current image to generate the being's image, which has a plurality of pixels;

mapping the being's image directly to a plurality of templates, each having a plurality of pixels, based on matching at least one pixel of the being's image upon its corresponding pixel in each of the templates, to generate a plurality of template outputs;

analyzing the template outputs to identify the specific pre-defined gesture that corresponds to the gesture in the image; and repeating from the step of retrieving to recognize another gesture of the image of the being based on the same background image.

2. A method as recited in claim 1 wherein:

the being is a player; and the gesture is used in an electronic game.

3. A method as recited in claim 2 wherein the player's sound is captured and is re-broadcasted in the electronic game.

4. A method as recited in claim 2 wherein the player's face is digitized and is used in the electronic game.

5. A method as recited in claim 1 wherein the background image and the current image are captured by more than one detector, with the different detectors capturing the images from different directions.

6. A method as recited in claim 1 further comprising the steps of:

retrieving a threshold value; and retrieving a upper limit value; and wherein:

each image has a plurality of pixels, with each pixel having a value;

the step of removing at least a portion of the background image further comprising the steps of:

comparing the difference between the value of each pixel in the background image and the value of the corresponding pixel in the current image with the threshold value to generate an energy level;

changing the threshold value if the energy level is higher than the upper limit value;

repeating from the step of comparing if the energy level is higher than the upper limit value; and generating the being's image based on the background image, the current image and the threshold value.

7. A method as recited in claim 6 wherein:

the templates are separated into a plurality of sets of templates;

each template has a bar of pixels whose values are non-zero;

the bars in the templates within each set are substantially parallel;

the orientations of the bars in different sets are different; and combining the bars within each set substantially covers the image.

8. A method as recited in claim 7 wherein:

the set of specific pre-defined gestures can be classified under one or more general pre-defined gestures; and the step of analyzing the template outputs further includes the steps of:

identifying at least one general pre-defined gesture; and identifying at least one specific pre-defined gesture in the identified general pre-defined gesture such that the specific pre-defined gesture corresponds to the gesture in the image.

9. A method as recited in claim 8 wherein the step of analyzing the template outputs further includes the step of selecting at least one approach out of the neural network approach and the rule-based approach to identify the specific pre-defined gesture that corresponds to the gesture in the image.

10. A method as recited in claim 9 wherein:

each template is represented by a hologram; and the step of mapping further comprises the step of optically correlating the being's image with the plurality of holograms to generate the template outputs.

11. A method as recited in claim 10 wherein:

the step of mapping further comprises the steps of identifying one specific position on the being's image based on the template outputs;

the repeating step identifies the change in the specific position of the being's image; and the step of analyzing the template outputs further comprises the step of analyzing the template outputs based on the change in the specific position of the being's image to identify the specific pre-defined gesture that corresponds to the gesture of the image.

12. A method as recited in claim 9 wherein the step of mapping further comprises the steps of:

digitally compressing the being's image to a compressed being's image;

digitally compressing the templates to a plurality of compressed templates; and generating the template outputs by a process that includes the step of performing inner products of the compressed being's image with the compressed templates.

13. A method for recognizing the gesture of the image of a being by identifying a gesture from a set of specific pre-defined gestures, with the image having a plurality of pixels, and with every pixel having a value, the method comprising the steps of:

retrieving the image of the being generated based on a background image, with the image of the being having a plurality of pixels;

retrieving a plurality of templates wherein:

the templates are separated into a plurality of sets of templates;

each template has a bar of pixels whose values are non-zero;

the bars in the templates within each set are substantially parallel;

the orientations of the bars in different sets are different; and combining the bars within each set substantially covers the image;

mapping the being's image to the plurality of templates based on matching at least one pixel of the being's image upon its corresponding pixel in each of the templates, to generate a plurality of template outputs;

analyzing the template outputs to identify the specific pre-defined gesture that corresponds to the gesture in the image; and repeating from the step of retrieving the image to recognize another gesture based on the same background image.

14. A method as recited in claim 13 wherein before the step of retrieving the image of the being, the method further comprises the steps of:

retrieving the background image that does not include the being's image;

retrieving a current image that includes the being's image and at least a portion of the background image; and removing at least a portion of the background image from the current image to generate the being's image.

15. A method for recognizing the gesture of the image of a being by identifying a gesture from a set of specific pre-defined gestures, which are classified into one or more general pre-defined gestures, the method comprising the steps of:

retrieving the image of the being generated based on a background image, with the image having a plurality of pixels;

mapping the being's image to a plurality of templates based on matching at least one pixel of the being's image upon its corresponding pixel in each of the templates, to generate a plurality of template outputs; and analyzing the template outputs by identifying at least one general pre-defined gesture;

identifying at least one specific pre-defined gesture in the identified general pre-defined gesture such that the specific pre-defined gesture corresponds to the gesture in the image; and repeating from the step of retrieving the image to recognize another gesture based on the same background image.

16. A method as recited in claim 15 wherein:

the step of identifying at least one general pre-defined gesture selects at least one approach out of a neural network approach and a rule-based approach; and the step of identifying at least one specific pre-defined gesture selects at least one approach out of a neural network approach and a rule-based approach.

17. A method as recited in claim 16 wherein the step of identifying at least one specific pre-defined gesture depends on at least the outputs from the step of identifying at least one general pre-defined gesture.

18. A method as recited in claim 16 wherein the step of identifying at least one specific pre-defined gesture further includes the step of applying a set of rules to the output of the neural network if the neural network approach has been selected.

19. A method for recognizing the gesture of the image of a being by identifying a gesture from a set of specific pre-defined gestures, with the image having a plurality of pixels, where every pixel has a value, the method comprising the steps of:

retrieving a background image;

retrieving a current image that includes the being's image and at least a portion of the background image;

retrieving a threshold value;

retrieving a upper limit value;

removing at least a portion of the background image from the current image to generate the being's image by:

comparing the difference between the value of each pixel in the background image and the value of the corresponding pixel in the current image with the threshold value to generate an energy level;

changing the threshold value if the energy level is higher than the upper limit value;

repeating from the step of comparing if the energy level is higher than the upper limit value; and generating the being's image based on the background image, the current image and the threshold value;

mapping the being's image to a plurality of templates to generate a plurality of template outputs, based on matching at least one pixel of the being's image upon its corresponding pixel in each of the templates;

analyzing the template outputs to identify the specific pre-defined gesture that corresponds to the gesture in the image of the being; and repeating from the step of retrieving a current image to recognize another gesture based on the same background image.

20. A method as recited in claim 19 wherein:

the captured images are gray-scale images with a plurality of pixels;

the step of comparing the difference comprises the steps of:

subtracting the value of each pixel in the background image from the value of the corresponding pixel in the current image to form a difference image;

for every pixel in the difference image:

if the magnitude of its value is below the threshold value, set that value to zero;

else setting that value to one to form the being's image; and adding the values of all of the pixels in the being's image to form the energy level; and the step of changing the threshold level comprises the steps of increasing the threshold value by a delta if the energy level is higher than the upper limit value.

21. A method as recited in claim 19:

further comprising the step of retrieving a lower limit value after the step of retrieving a upper limit vale; and wherein:

the step of changing the threshold value further comprises the step of changing the threshold value if the energy level is lower than the lower limit value; and the step of repeating from the step of comparing further comprises the step of repeating from the step of comparing if the energy level is lower than the lower imit value.

22. A method for recognizing the gesture of the image of a being by identifying a gesture from a set of specific pre-defined gestures, the method comprising the steps of:

retrieving a background image;

retrieving a current image that includes the being's image and at least a portion of the background image;

removing at least a portion of the background image form the current image to generate the being's image, which has a plurality of pixels;

mapping the being's image to a plurality of templates based on matching at least one pixel of the being's image upon its corresponding pixel in each of the templates, to generate a plurality of template outputs; with each template being represented by a hologram; and with the template outputs being generated by optically correlating the being's image with the plurality of holograms;

analyzing the template outputs to identify the specific pre-defined gesture that corresponds to the gesture in the image; and repeating from the step of retrieving a current image to recognize another gesture based on the same background image.

23. A method as recited in claim 22 wherein all of the holograms reside substantially in the same area of a holographic medium.

24. A method as recited in claim 22 wherein:

the holograms reside in different locations of a holographic medium;

the being's image is duplicated into a number of duplicated images; and each duplicated image is directed to one hologram to perform optical correlation.

25. A method for recognizing the gesture of the image of a being by identifying a gesture from a set of specific pre-defined gestures, with the image having a plurality of pixels, where every pixel has a value, the method comprising the steps of:

retrieving the being's image, which is digitized, with the being's image generated based on a background image;

retrieving a plurality of templates, which are digitized;

digitally compressing the being's image to a compressed being's image;

digitally compressing the templates to a plurality of compressed templates; and mapping the compressed being's image to the plurality of compressed templates based on matching at least one pixel of the being's image upon its corresponding pixel in each of the templates, to generate a plurality of template outputs, with each template output being generated by the process that includes the step of performing an inner product of the corresponding compressed template with the compressed being's image;

analyzing the template outputs to identify the specific pre-defined gesture that corresponds to the gesture in the image; and repeating from the step of retrieving the being's image to recognize another gesture based on the same background image.

26. A method as recited in claim 25 wherein:

the being's image is binarized;

the plurality of templates are binarized; and at least one inner product performs the AND operation between the compressed being's image and a compressed template.

27. A method as recited in claim 26 wherein one inner product uses a look-up table.

28. A method for recognizing the gesture of the image of a being by identifying a gesture from a set of specific pre-defined gestures, with the image having a plurality of pixels, where every pixel has a value, the method comprising the steps of:

retrieving a background image;

retrieving a current image that includes the being's image and at least a portion of the background image;

removing a least a portion of the background image from the current image to generate the being's image, which includes a plurality of pixels;

mapping the being's image to a plurality of templates based on matching at least one pixel of the being's image upon its corresponding pixel in each of the templates, to generate a plurality of template outputs;

analyzing the template outputs by selecting at least one approach out of the neural network approach and the rule-based approach to identify the specific pre-defined gesture that corresponds to the gesture in the image; and repeating from the step of retrieving a current image to recognize another gesture based on the same background image.

29. A method as recited in claim 28 wherein the neural network is a multi-level neural network.

30. A method as recited in claim 28 wherein:

the set of specific pre-defined gestures are classified into one or more general pre-defined gestures;

the step of analyzing includes the steps of:

entering the template outputs into the neural network to generate a set of neural outputs representing at least one general pre-defined gesture that the gesture of the image should be categorized as; and applying a set of rules to the neural outputs to identify the specific pre-defined gesture that corresponds to the gesture in the image.

31. A method as recited in claim 28 wherein:

the set of specific pre-defined gestures are classified into one or more general pre-defined gestures;

the neural network includes a first level neural network and a second level neural network; and the step of analyzing includes the steps of:

entering the template outputs into the first level neural network to generate a first set of neural outputs, which represent at least one general pre-defined gesture that the gesture of the image should be classified as; and entering at least the first set of neural outputs into the second level neural network to identify the specific pre-defined gesture that corresponds to the gesture in the image.

32. A method as recited in claim 31 wherein the step of analyzing further includes the step of applying a set of rules to the output of the second level neural network to identify the specific pre-defined gesture that corresponds to the gesture in the image.

33. A method for recognizing the gesture of the image of a being by identifying a gesture from a set of specific pre-defined gestures, the method comprising the steps of:

retrieving the image of the being generated based on a background image, with the being's image having a plurality of pixels;

mapping the being's image to at least one set of a plurality of sets of templates based on matching at least one pixel of the being's image upon its corresponding pixel in each of the templates, to generate a plurality of template outputs;

identifying at least one specific position on the being's image based on the template outputs;

repeating from the step of retrieving based on the same background image to identify the change in the specific position of the being's image;

analyzing the template outputs based on the change in the specific position of the being's image to identify the specific pre-defined gesture that corresponds to the gesture of the image.

34. A method as recited in claim 33 wherein:

the specific position is the center of the being's image;

the steps of mapping includes the step of mapping the being's image to each template to generate a plurality of template outputs; and the method further comprises the step of deleting at least one template output based on the change in the position of the center of the being's image before the step of analyzing the template outputs.

35. A method as recited in claim 33 wherein before the step of analyzing, the method further comprises the steps of:

deleting at least one template from one set of templates that has not been mapped to the being's image, based on the change in the specific position of the being's image; and mapping the being's image to the templates that have not been mapped before to generate additional template outputs.

* * * * *